United States Patent
Bhogal et al.

(10) Patent No.: US 9,086,725 B2
(45) Date of Patent: Jul. 21, 2015

(54) METHOD AND SYSTEM FOR SYNCHRONIZATION AND MANAGEMENT OF SYSTEM ACTIVITIES WITH LOCALLY INSTALLED APPLICATIONS

(71) Applicant: International Business Machines Corporation, Armonk, NY (US)

(72) Inventors: Kulir Singh Bhogal, Fort Worth, TX (US); Gregory Jensen Boss, Saginaw, MI (US); Rick A. Hamilton, Charlottesville, VA (US); Anne R. Sand, Peyton, CO (US)

(73) Assignee: International Business Machines Corporation, Armonk, NY (US)

( * ) Notice: Subject to any disclaimer, the term of this patent is extended or adjusted under 35 U.S.C. 154(b) by 304 days.

(21) Appl. No.: 13/669,965

(22) Filed: Nov. 6, 2012

(65) Prior Publication Data
US 2014/0129945 A1 May 8, 2014

(51) Int. Cl.
| | |
|---|---|
| *H04N 7/15* | (2006.01) |
| *G06F 17/30* | (2006.01) |
| *G06F 3/01* | (2006.01) |

(52) U.S. Cl.
CPC ............ *G06F 3/01* (2013.01); *G06F 17/30056* (2013.01); *H04N 7/15* (2013.01); *G06F 17/30902* (2013.01); *G06F 2216/15* (2013.01)

(58) Field of Classification Search
CPC .................. G06F 17/30902; G06F 17/30056; G06F 2216/15; H04L 12/1827; H04L 67/1095; H04N 7/15
USPC ................................................. 715/730, 732
See application file for complete search history.

(56) References Cited

U.S. PATENT DOCUMENTS

| | | | |
|---|---|---|---|
| 6,654,785 B1 * | 11/2003 | Craig ............................ | 709/203 |
| 6,989,801 B2 * | 1/2006 | Bruning ........................ | 345/2.1 |
| 7,203,706 B2 | 4/2007 | Liu et al. | |
| 7,240,287 B2 * | 7/2007 | Qureshi et al. ................ | 715/730 |
| 7,275,116 B1 | 9/2007 | Hanmann et al. | |
| 7,340,534 B2 | 3/2008 | Cameron et al. | |
| 7,383,495 B2 * | 6/2008 | Dontcheva et al. ........... | 715/200 |
| 7,526,525 B2 * | 4/2009 | Hagale et al. ................. | 709/204 |
| 7,552,228 B2 * | 6/2009 | Parasnis et al. ............... | 709/231 |
| 7,757,114 B2 | 7/2010 | Watanabe | |
| 8,473,571 B2 * | 6/2013 | Penner et al. ................. | 709/217 |
| 8,794,979 B2 * | 8/2014 | Beavers et al. ............... | 434/323 |
| 2005/0039133 A1 * | 2/2005 | Wells et al. ................... | 715/740 |
| 2005/0138540 A1 | 6/2005 | Baltus et al. | |
| 2005/0246642 A1 * | 11/2005 | Valderas et al. .............. | 715/730 |
| 2006/0235927 A1 * | 10/2006 | Bhakta et al. ................. | 709/204 |
| 2007/0143682 A1 * | 6/2007 | Kelley et al. .................. | 715/730 |
| 2007/0226625 A1 * | 9/2007 | Cardone et al. ............... | 715/732 |
| 2007/0282948 A1 * | 12/2007 | Praino et al. .................. | 709/204 |
| 2008/0005233 A1 * | 1/2008 | Cai et al. ....................... | 709/204 |

(Continued)

*Primary Examiner* — Nicholas Ulrich
(74) *Attorney, Agent, or Firm* — David A. Mims, Jr.; Darcell Walker

(57) ABSTRACT

The present invention enables the host (presenter) to monitor and identify the current slide of the host presentation that is being displayed on a local user machine. The host is able to receive queries such as instant messages from local user's viewing the presentation and identify a particular presentation slide with contents that formed the basis for the question. The present invention generates a transcript of the local user activities that occurred during the presentation. This transcript helps the host presenter understand the contents of the activities and the basis for queries made to the host presenter.

5 Claims, 10 Drawing Sheets

(56) References Cited

U.S. PATENT DOCUMENTS

| | | | |
|---|---|---|---|
| 2008/0154907 A1 | 6/2008 | Prasad et al. | |
| 2009/0063945 A1* | 3/2009 | Bhogal et al. | 715/203 |
| 2009/0254839 A1* | 10/2009 | Kripalani et al. | 715/753 |
| 2010/0023849 A1* | 1/2010 | Hakim et al. | 715/202 |
| 2010/0023876 A1* | 1/2010 | Shuf et al. | 715/753 |
| 2010/0037151 A1* | 2/2010 | Ackerman et al. | 715/753 |
| 2010/0169951 A1* | 7/2010 | Vaughan et al. | 726/3 |
| 2010/0174773 A1* | 7/2010 | Penner et al. | 709/203 |
| 2010/0257456 A1* | 10/2010 | Lieb et al. | 715/741 |
| 2011/0029482 A1 | 2/2011 | Gimson et al. | |
| 2011/0029658 A1 | 2/2011 | Werth et al. | |
| 2011/0161834 A1* | 6/2011 | Shadfar et al. | 715/753 |
| 2011/0264745 A1* | 10/2011 | Ferlitsch | 709/205 |
| 2011/0307788 A1* | 12/2011 | Cheung et al. | 715/731 |
| 2012/0203844 A1* | 8/2012 | Wang et al. | 709/206 |
| 2013/0073965 A1* | 3/2013 | Sik et al. | 715/730 |
| 2013/0110937 A1* | 5/2013 | Burns et al. | 709/205 |
| 2013/0227420 A1* | 8/2013 | Pasquero et al. | 715/730 |
| 2014/0111597 A1* | 4/2014 | Anderson et al. | 348/14.03 |
| 2014/0123002 A1* | 5/2014 | Wessling et al. | 715/273 |

* cited by examiner

METHOD AND SYSTEM FOR SYNCHRONIZATION AND MANAGEMENT OF SYSTEM ACTIVITIES WITH LOCALLY INSTALLED APPLICATIONS

CROSS-REFERENCE TO RELATED APPLICATIONS

This invention relates to applications Ser. Nos. 13/668,294 and 13/668,561 the contents of which are incorporated by reference herein.

FIELD OF THE INVENTION

This invention relates to a method and system for synchronizing and monitoring information and activities of a remotely located host machine device that are occurring and being displayed at a local user machine. In particular, the present invention relates to a method and system for synchronizing and monitoring host machine display slides containing information located and displayed at a local machine location. The present invention further relates to a method and system for capturing and documenting local user activities related to host display slides shown at the local user machine location.

BACKGROUND OF THE INVENTION

Slide presentations are a major form of communicating information to people. These presentations comprise information displayed on one or more slides with verbal communications based on the information displayed on the slides. Historically, these presentations have occurred in front of groups of people at one location. For example, a major component of many seminars and workshops is the slide presentation. The advancements in technology have provided new ways to use slide presentations to convey information to people. The internet has initiated new ways for people to communicate and exchange information.

One activity resulting from technology advancements has been web-conferencing. Web conferencing is a procedure that allows conferencing events to be shared with multiple remote locations. This procedure and format allows real-time point-to-point communications between parties. In addition, web-conferencing provides for multicast communications from one sender to many receivers. Web-conferencing technology also offers information of text-based messages, voice and video chat to be shared simultaneously, across geographically dispersed locations. Applications for web conferencing include meetings, training events, lectures, or short presentations from any computer.

FIG. 1 illustrates a general configuration for a web-based conference or seminar. This process begins with the creation of a presentation that usually contains some audio and visual elements such as slides. The creator/presenter 100 uploads this presentation to a host provider location 102. This host provider can be a server device located on a network that is remote from the presenter and from those who will eventually view the presentation. Common names for this type of presentation in this format include web-conferencing and web-seminar ("webinar"). In implementation, the presenter 100 announces the activity and invites persons to attend. At the time of the activity, the presenter 100 accesses the presentation at the hosting provider 102. The attendees 104, 106, 108 and 110 also access the hosting provider to view the presentation. In the current webinar configuration, the presenter has access to and controls the presentation. The attendees access the hosting provider and view the presentation. The attendees have no control over the visual information presented. In some configurations, the attendees can ask questions of the presenter. When an attendee asks a question, die presenter can stop the presentation and answer the question. As shown in FIG. 1, the presenter 100 has the ability to transmit to and receive information from the hosting provider 102. However, as also shown, the attendees can only access and view information from the hosting provider.

During a webinar, the attendees can view the slides from the hosting provider. In another arrangement, the attendees can download the presentation to their local machine and view the presentation as it is occurring. However, in some instances, attendees may join a presentation after the start of the presentation. When this occurs, some attendees do not know the current slide of the presentation. The attendee can spend substantial time trying to locate the current location slide of the presentation. In other situation, when an attendee/user has downloaded the presentation and is controlling it at the user local machine, the user may temporarily leave the presentation. As a result, the user will lose the current location of the presentation. Still further, a local user viewing the presentation may have a question about the contents of a particular slide. However, when the host (presenter) receives the question, the host does not receive information about or the identity of the specific slide that is the basis for the question.

Although the present inventors of this application are designing technology that will enable an attendee to download an entire presentation and synchronize the contents of the presentation being displayed at the host location with the slide information being displayed at the local user machine, there remains a need for a method and system to enable the host to identify the current slide being displayed at a local user machine, to identify a presentation slide that is the basis of a presentation question and to produce a transcript of local user activities that occur during a host presentation.

SUMMARY OF THE INVENTION

A first embodiment of the present invention enables the host (presenter) to monitor end identify the current slide of the host presentation that is being displayed on a local user machine. In another embodiment of the present invention, the host is able to receive queries such as instant messages from local user's viewing the presentation and identify a particular presentation slide with contents that formed the basis for the question. A third embodiment of the present invention generates a transcript of the local user activities that occurred during the presentation. This transcript helps the host presenter understand the contents of the activities and the basis for queries made to the host presenter.

In the first embodiment the host presenter system location will able to query the local machine of each user viewing the presentation. The query can request current slide states information. The information sent to the host presenter system can identify the specific local user machine and to presentation slide currently being displayed at that local user machine. From this information, a host presenter can get an indication of the interest in the presentation contents and an indication of whether local user participants are having difficulties comprehending information conveyed during the presentation.

In the second embodiment, the host presenter is able to identify a particular presentation related to a query from a local user viewing the presentation. With this information, it is not necessary for the host presenter to spend substantial time trying to contexualize a question in order to properly respond to the question.

The third embodiment will produce a transcript of the local user activities that occurred during the presentation. This transcript will enable the host presenter to review the activities that occurred during the presentation, in order to assess the effectiveness of the presentation and as a tool to assist in enhancing the information for future presentations.

DETAILED DESCRIPTION OF THE INVENTION

This system of the present invention will enable the user to follow a presentation while waiting for presentation files to download to the user's local machine. This invention provides a dynamic cloud based approach to local hand-off. It will enable users to view a cloud or other remotely-based (found via a URL) or screen-shared version of the presentation until a designated threshold portion of the source material has downloaded. After the downloading of the designated threshold portion of the material has occurred, the user will be able to view at the local machine of the user, the presentation while the remainder of the presentation continues to download.

Figure 1:
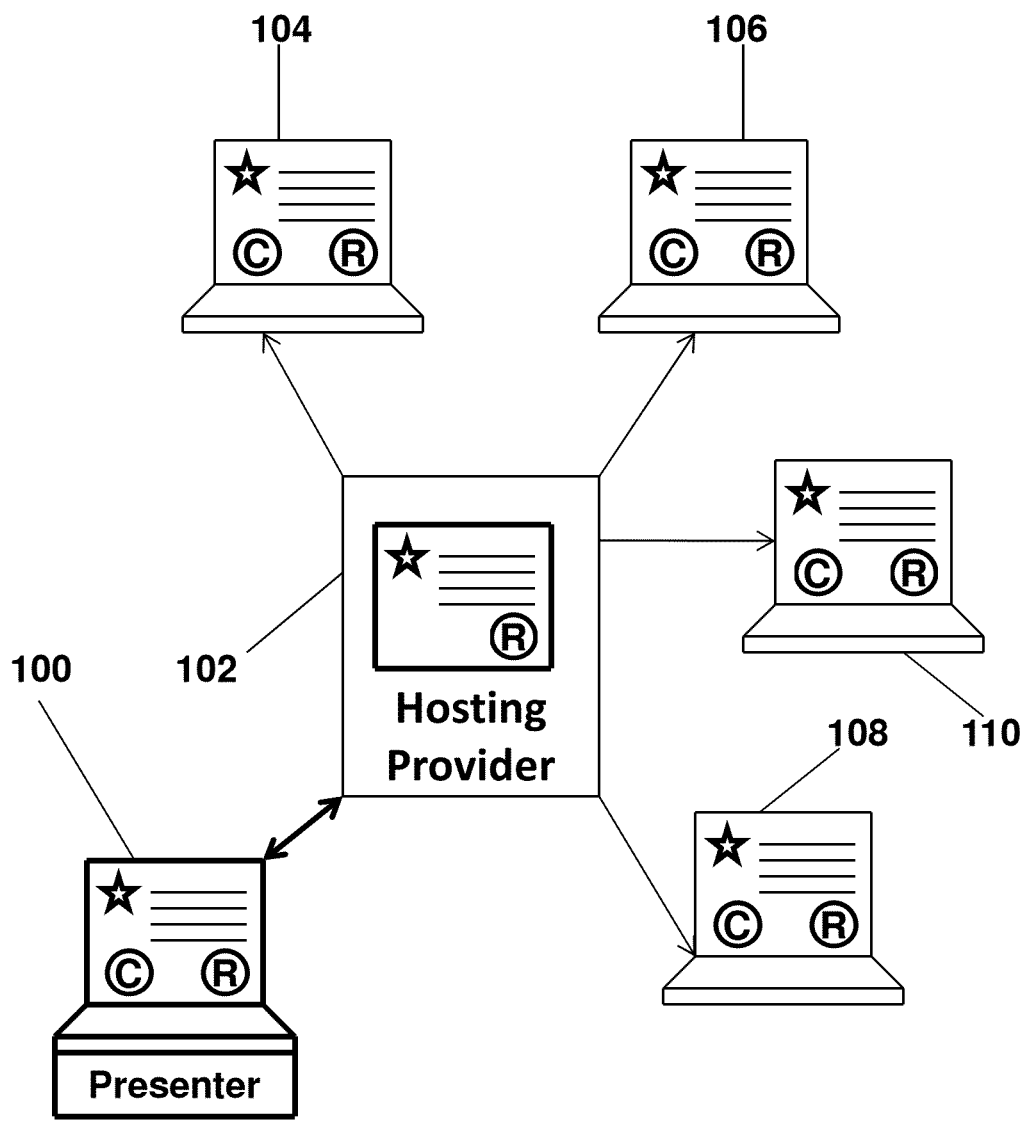
FIG. 1 is a view of a configuration of a conventional web-conferencing event.
Figure 2:
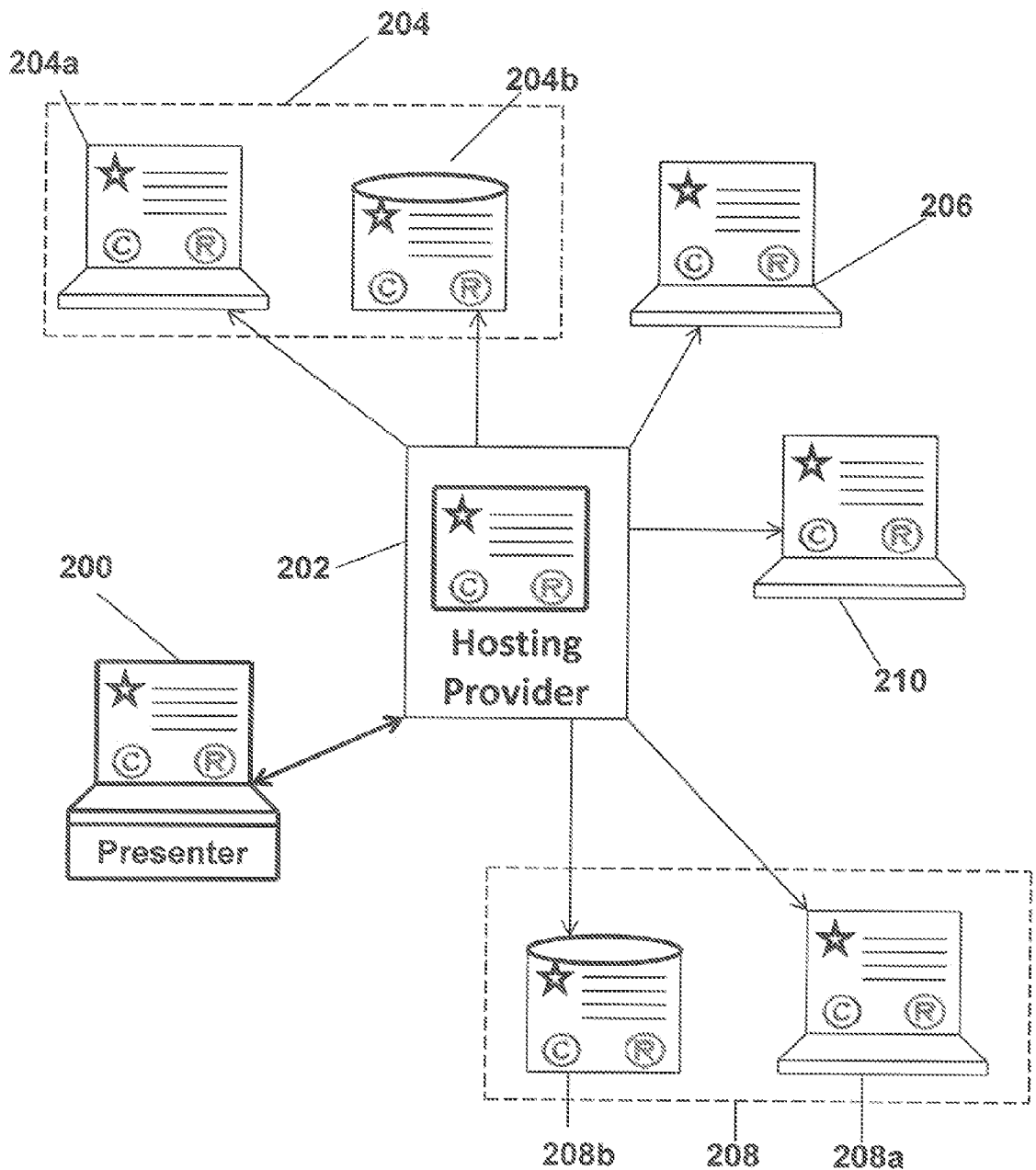
FIG. 2 is a view of a configuration of a web-conferencing event in which an attendee views the displayed information while the information is being downloaded to the attendee's local machine.

Referring to FIG. 2, shown is a configuration of the system of the present invention in which a presenter 200 is in communication with the hosting provider 202 and begins to conduct a presentation. As mentioned, the presenter has the ability to remotely control the presentation at the hosting provider 202. The user attendees connect to the hosting provider to access the presentation. In this configuration, two of the attendees (206 and 210) are viewing the presentation in a conventional manner. Attendees (204 and 208) are viewing the presentation by implementing the method and system of the present invention. As shown, attendee 204 comprises a computing device 204a and a memory device 204b. The same shows for attendee 208. Both the computing device 204a, 208a and the memory device 204b, 208b are directly connected to the hosting provider 202. At the initiation of the presentation, the presentation content is being viewed on the computing device 204a while it is also being stored on the memory device 204b. Once the download of the contents is complete, the present invention will synchronize the downloaded presentation with the current location of the presentation at the hosting provider. This synchronizing action is part of the formal hand-off of the presentation from the hosting provider to the local user. At this point, the user can begin, viewing the presentation contents from the presentation file stored in the memory device 204b.

Figure 3:
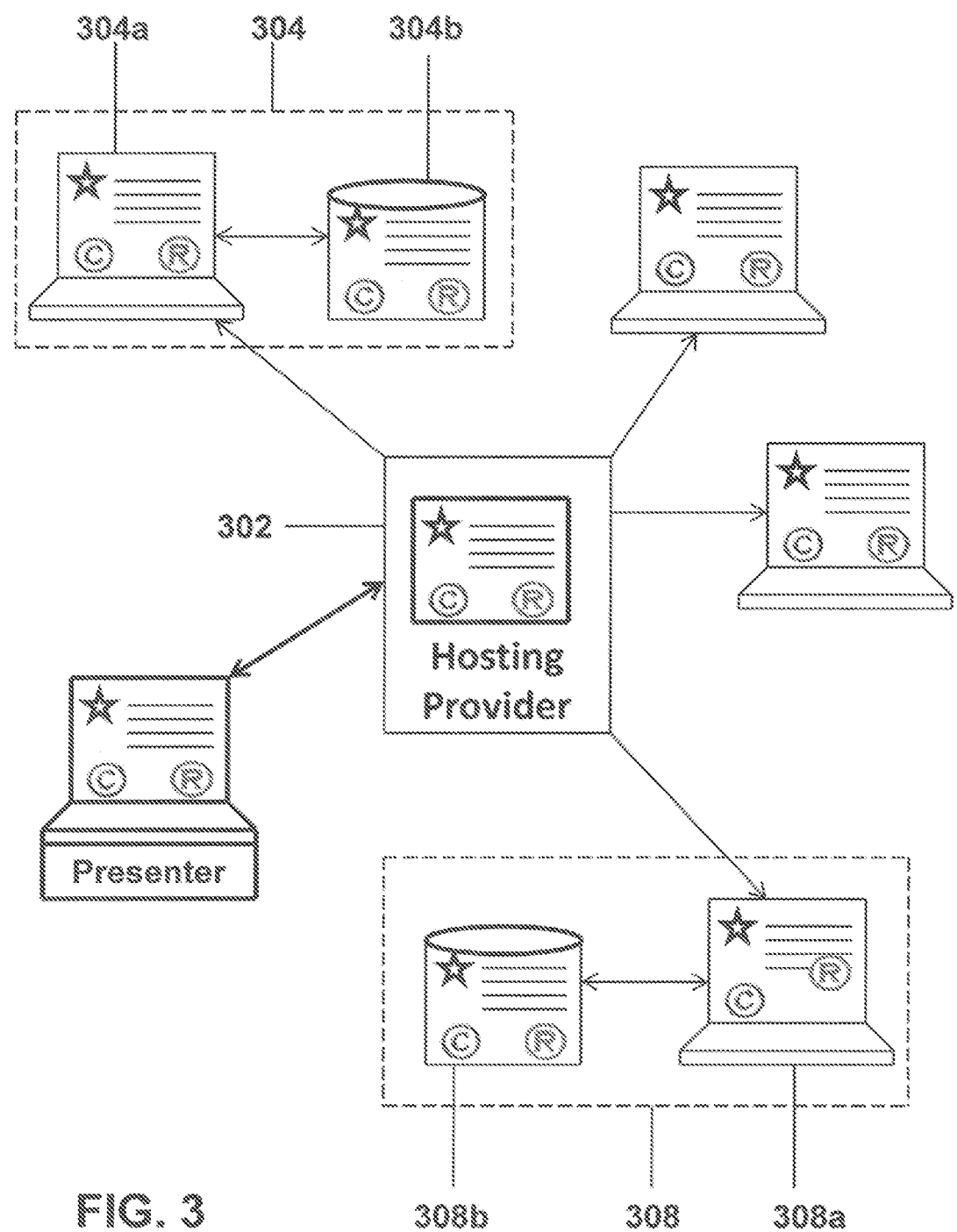
FIG. 3 is a view of a configuration, of a web-conferencing event in which an attendee views the displayed information on the attendee's local machine.

FIG. 3 shows a configuration of the present invention wherein an attendee 304 is viewing a downloaded presentation, file of the presentation, stored in the memory device 304b from the computing device 304a. The computing device 304a is In communication with the memory device 304b and with the hosting provider 302. The user will view the presentation file stored an the memory device on the computing device. The user will listen to the audio of the presentation directly from the hosting provider.

Figure 4:
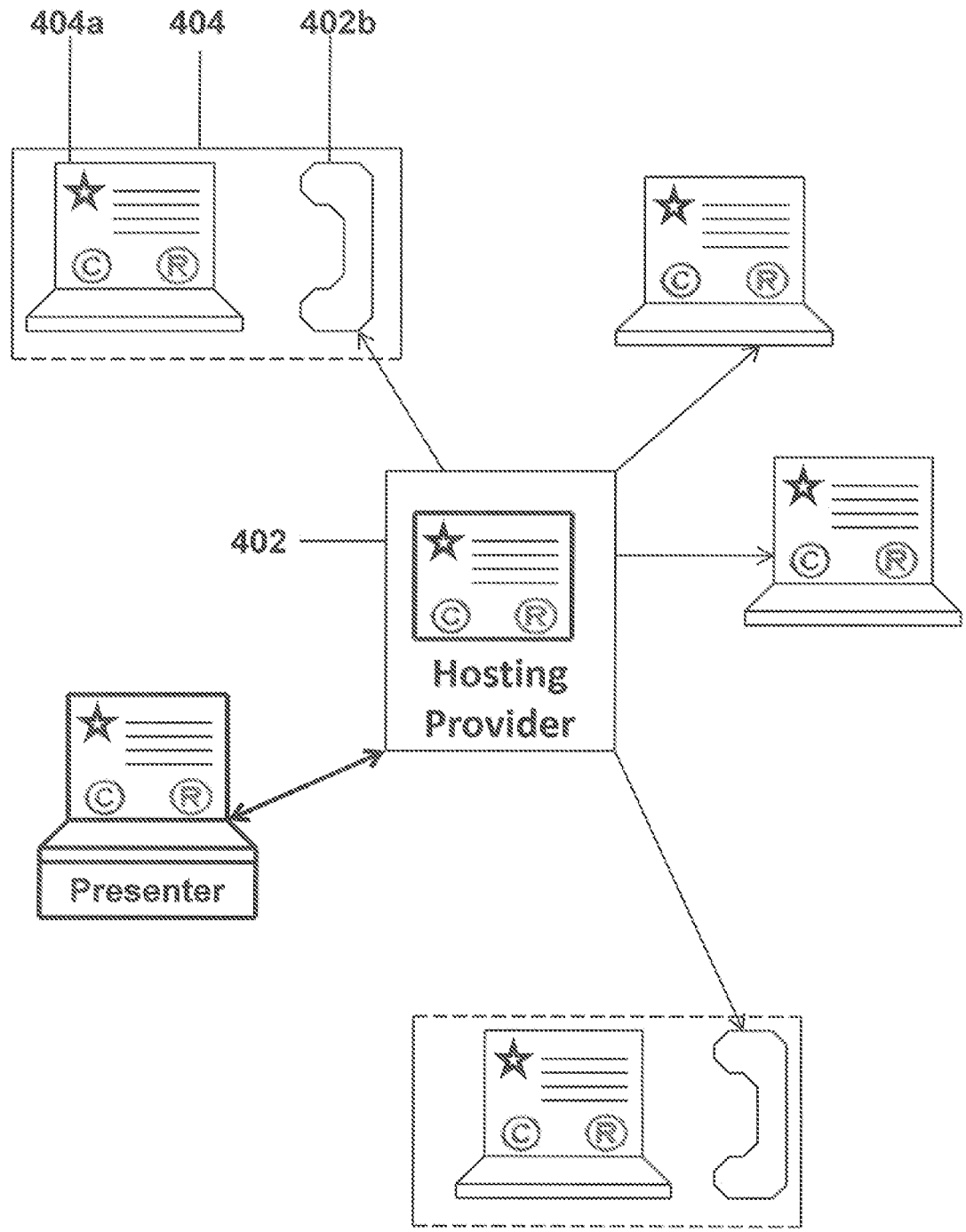
FIG. 4 is a view of a configuration of a web-conferencing event in which an attendee views the displayed information on the attendee's local machine, while accessing presentation audio from another device.

In most configurations, the memory device and the computing device are the same physical device. Further, when viewing many of these online/webinar presentations, the user is located at some stationary location. However, with the active lives of many individuals, there can be situations when a user does not nave time to sit at one location and view an entire presentation. FIG. 4 is a configuration wherein a user can view a presentation while traveling. The user 404 will initially download the presentation file from the hosting provider 402 to a local storage location. In this configuration, the local storage device is in the computing device 404a. As mentioned, once the presentation file is downloaded to the local memory/machine 404a, the presentation is automatically synchronised to the currently slide location of the presentation. The user can incorporate a second electronic device to access the hosting provider 402. The second user device can be any device that, will enable access to the audio portion of the presentation. Once the user has established an audio connection to the hosting provider 402, the user can listen to the presentation while viewing the presentation information. For example, with this configuration, a user can view a real-time presentation while riding a motor vehicle.

Figure 5:
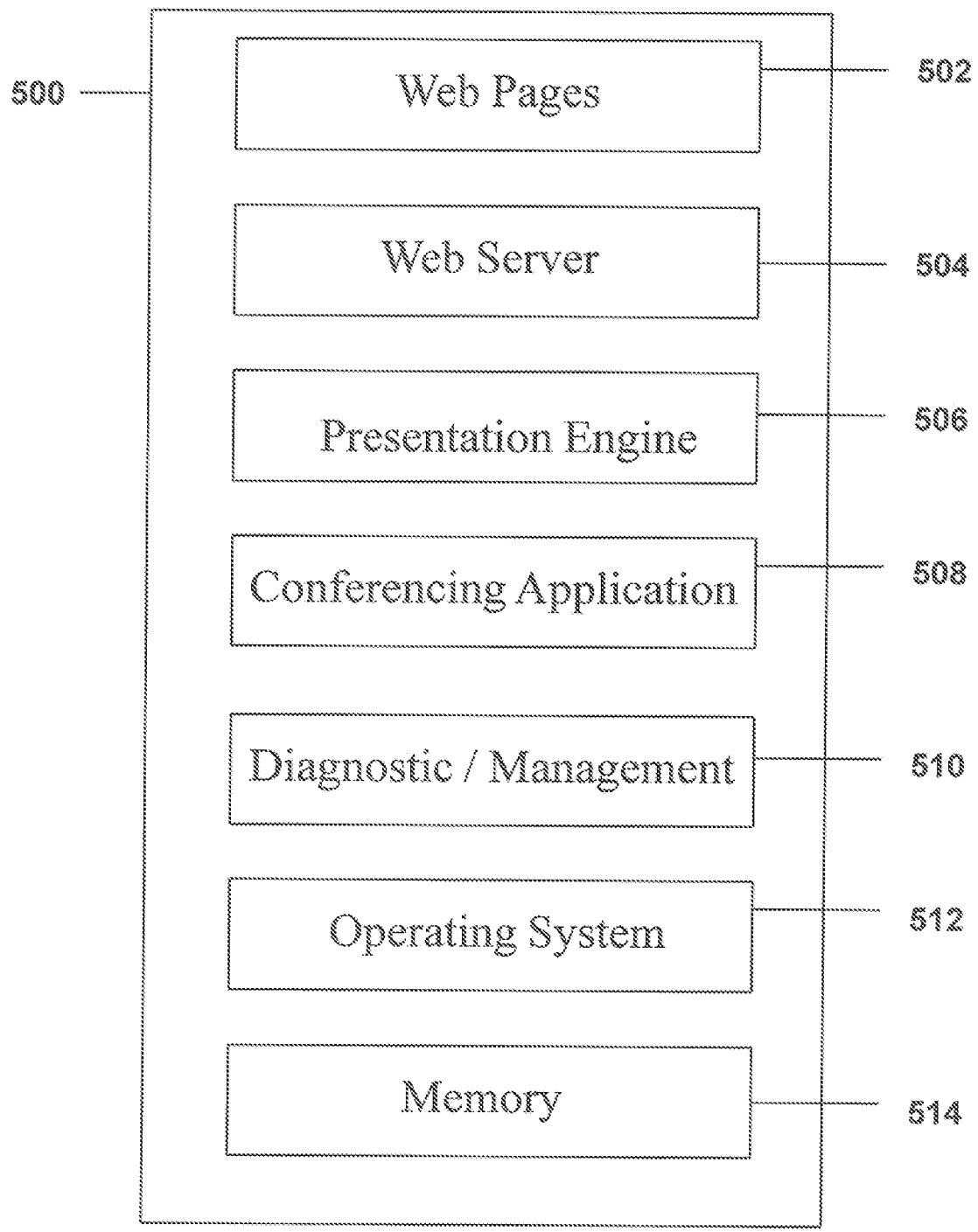
FIG. 5 is a view of the components of a web-hosting provider.

FIG. 5 illustrates basic components of the hosting provider device. As mentioned, the hosting provider can be a server machine located on a communication network. Presenters would upload their presentations to the hosting provider. Users would access the hosting provider to view the presentations and download presentations to local user machines. The hosting provider 500 can also be a configuration of components that form a hosting system. As illustrated, this hosting provider 500 can comprise a series of web pages 502 and a web server 504. A presentation engine 506 and conferencing applications 508 are the main components to facilitate the presentation options and functions of the present invention. The diagnostic and management module 510 ensures that the hosting provider continues to properly function. The operating system 512 and the memory 514 are basic components of any computing system.

Figure 6:
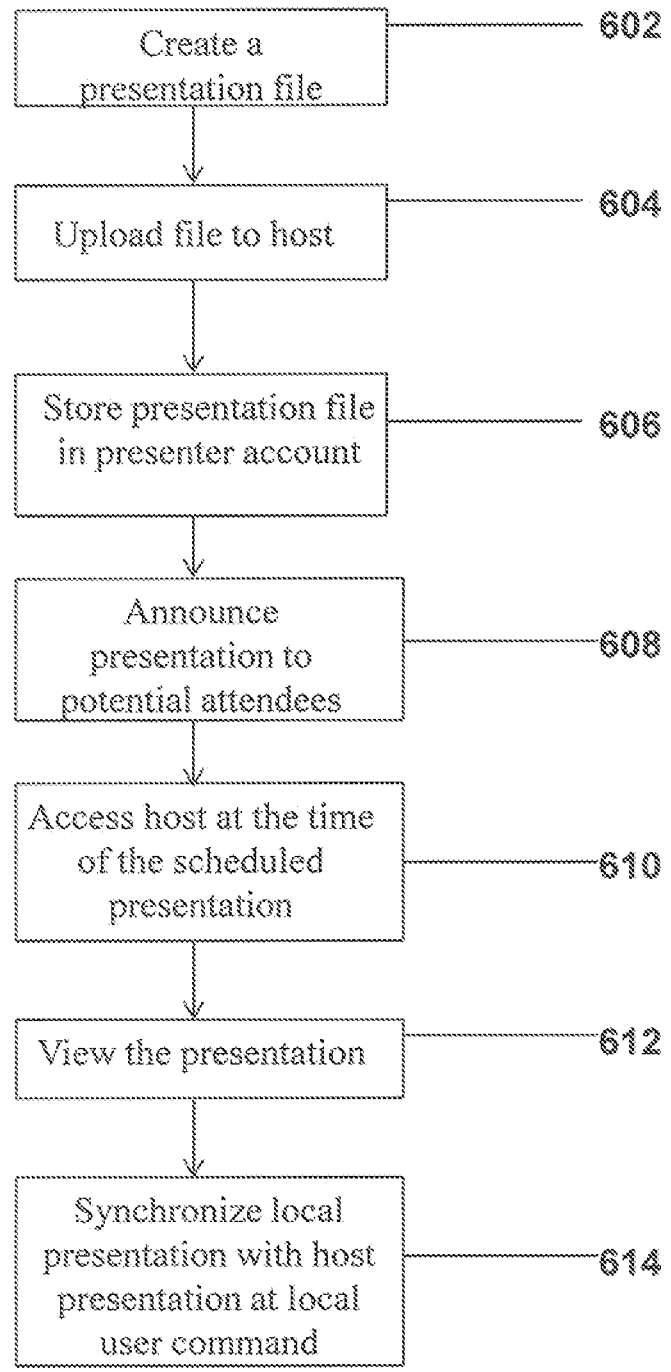
FIG. 6 is a general flow diagram of the steps in viewing an online presentation.

The present invention comprises a system and a method for synchronization and management of system activities with locally installed applications. FIG. 6 illustrates a flow diagram of the general steps in creating a presentation and viewing the presentation from the hosting provider. In step 602, a presenter prepares a presentation, and creates a presentation file. This presentation file could be a PowerPoint type file with multiple slides containing presentation information. After completion of the creation of the presentation file, the presenter uploads the presentation file to the host provider in step 604. The host stores the presentation file in an account for that particular presenter. This tile storage activity occurs in step 606. Before the actual presentation, in step 668 announcement of the presentation is sent out to potential attendees. The presentation announcement contains information about the presentation topic, presentation time and presentation access information. At the time of the presentation, the presenter and attendees who chose to view the presentation will access the hosting provider in step 610. In step 612, the presentation begins with the presenter in control and presenting the information to the attendees. The attendees access the presentation and view the presentation from their local computing machines. Step 614 then synchronizes the presentation viewed at the local user machine with the presentation being displayed and transmitted at the host location.

Figure 7:
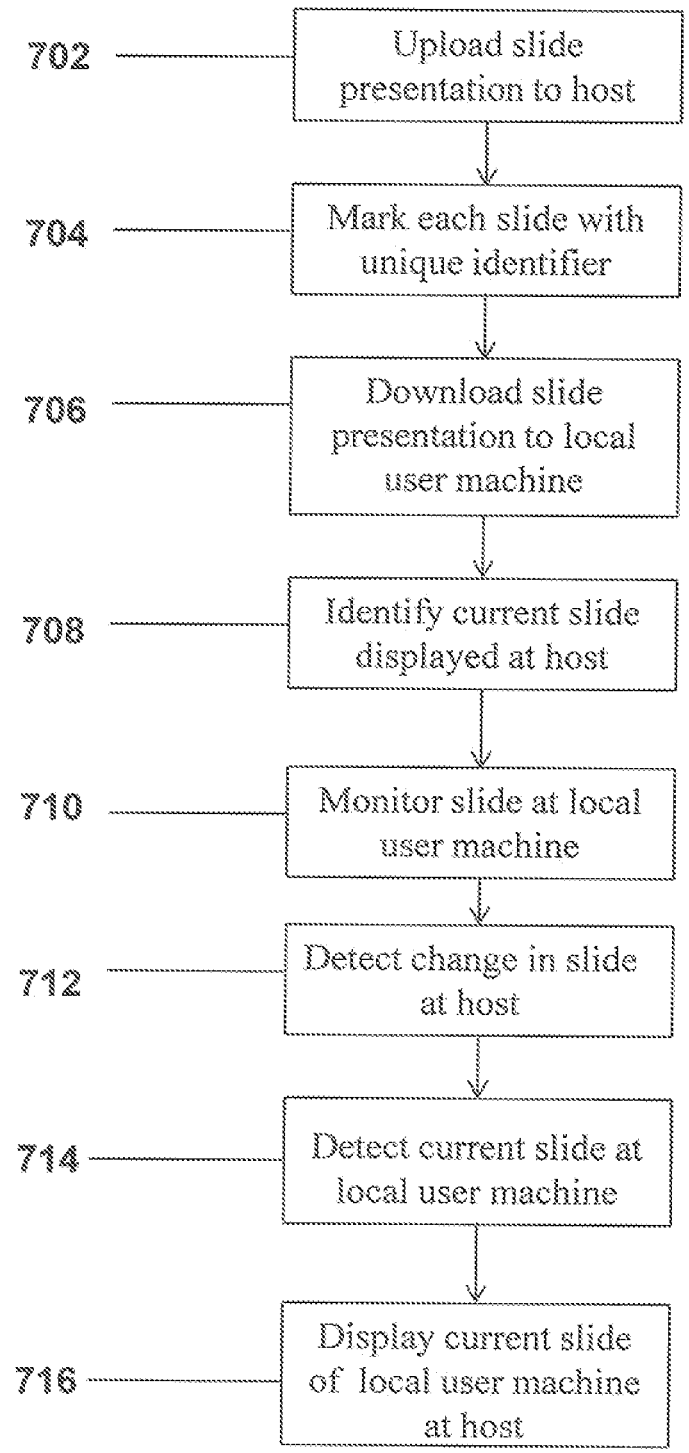
FIG. 7 is a flow diagram of the steps in the method of the present invention for identifying the current slide being displayed at a local user machine and displaying that identified slide at the host.

FIG. 7 is a flow diagram of the steps in the method of the present invention for identifying the current slide being displayed at a local user machine and displaying that identified slide at the host. In the initial step 702, a presenter uploads a presentation to the host system machine location. As part of the presentation upload, step 704 marks each slide in the presentation with a unique slide identifier. This marking step can occur as the presentation is being uploaded or it can occur after the upload is complete. The unique identifier can he as simple as a slide numbering system. The objective is to create a means to identify each slide of the presentation. In step 706, a user downloads the presentation to the user's local machine. As described in the above-identified related applications, a user at a local machine may choose to locally view the presentation instead of the conventional way of viewing the presentation horn the host location. Also, the user may initially begin viewing the presentation via the host location, then transfer access to the presentation to the user's local machine.

In this method, step 708 identifies the slide currently being displayed by the presenter at the presentation host location. Step 710 then monitors the local user machines that are viewing the presentation. As part of the monitoring step, the method identifies the current slide being displayed at the local user machines. This identification, can be accomplished by querying each local user machine and receiving a states indicating the current slide being shown at a local user machine. During the monitoring process, when the presenter changes to another slide to display, step 712 detects the change in slides being displayed at the host. When this change in slides occurs at the host location, step 714 then monitors the local user machines to determine if the change in presentation slides has occurred at each local user machine. Again, this monitoring and detection could be by sending a query to each local user machine and assessing whether a change in presentation slides has occurred. An optional command to synch the local user machine presentation with the host presentation can also occur at this step. After receiving a response to a submitted query, step 716 displays at the host location, the current slide being displayed for each local user machine.

Figure 8:
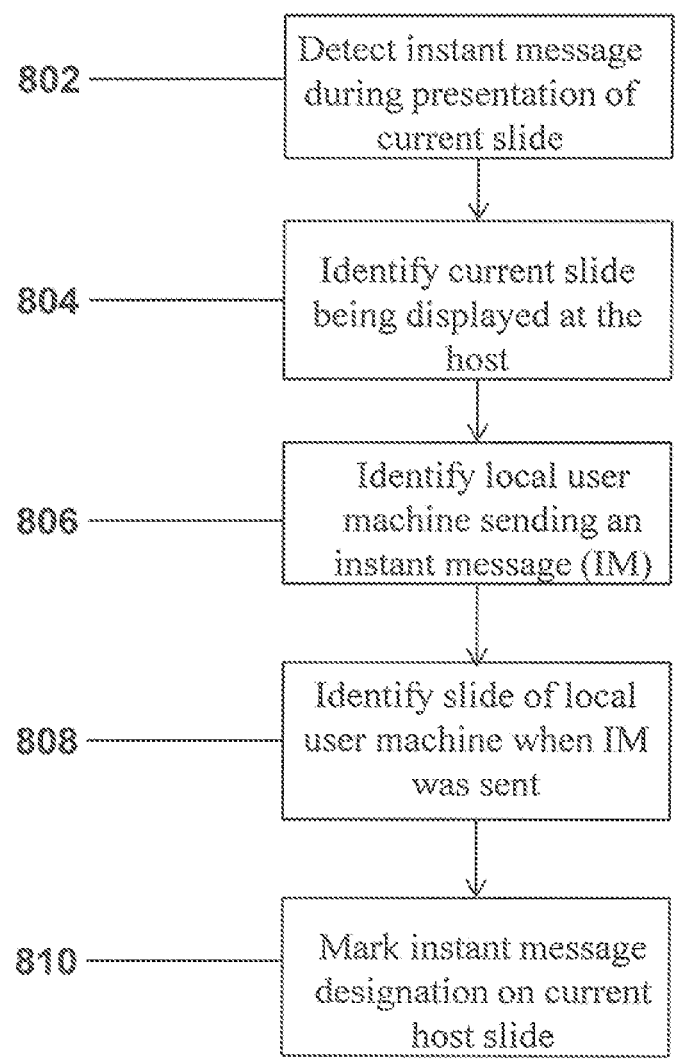
FIG. 8 is a flow diagram of the steps in the method of the present invention for identifying an instant message (IM) from a local user machine.

FIG. 8 discloses an embodiment of the present invention for identifying an instant message (IM) submitted to a host from a local user machine during the slide presentation at the host location. In this embodiment, step 802 detects an instant message being received at dm host location during the slide presentation. Step 804 then identifies the current presentation slide being displayed at the host location. As mentioned, the slide identification process can he through a slide numbering system or other slide identification system. At this point, the method, in step 806, identifies the local user machine that submitted the instant message. This identification can also be through a system that identifies each local user machine viewing the presentation. Step 808 then identifies the current slide being shown by the local machine the submitted the instant message. Step 810 then marks the current slide of the host that is displayed when the instant message is received by the host. This marking step can also include the current information about the current slide the local user who submitted the instant message was viewing at the time of the submission of the instant message.

Figure 9:
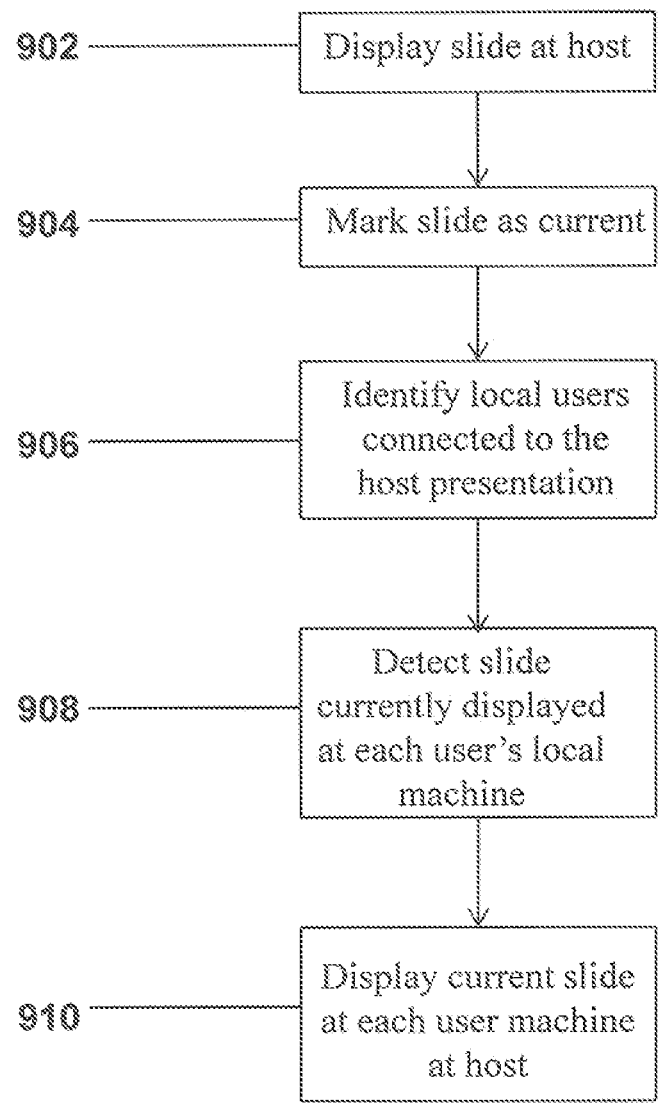
FIG. 9 is a flow diagram of the steps in the method of the present invention for identifying and displaying at the host, the current slide being displayed at a local user machine.

FIG. 9 is an embodiment of the present invention, that identifies and displays at the host, the current slide being displayed at a local user machine. This embodiment enables the host presenter to know if the local user audience is at the same point of the presentation as the host presenter. As the slide presentation proceeds, step 902 displays a slide at the host location. This displayed side is the current slide of the presentation. As the slide is displayed, this slide is marked as the current slide in step 904. Step 906 then identifies attendees viewing the presentation. These attendees can be ones directly connected to the host and viewing the presentation from the host location. These attendees can also be the local users viewing the presentation from their local machines. For the attendees viewing the slide presentation from their local machines, one way step 906 identifies users is based on their download of the slide presentation to their local machines. Since the host knows the slide of the attendees viewing the presentation from the host, step 906 is only applicable to the local user attendees. After the identification of the local user machine accessing the presentation, step 908 detects the slide currently being displayed at each local user machine. This detection step can be accomplished by sending queries from the host to local user machines for current display slide status and receiving slide status information of each local user machine at the host. At this point, step 910 displays the slide status information for each local user machine at the host.

Figure 10:
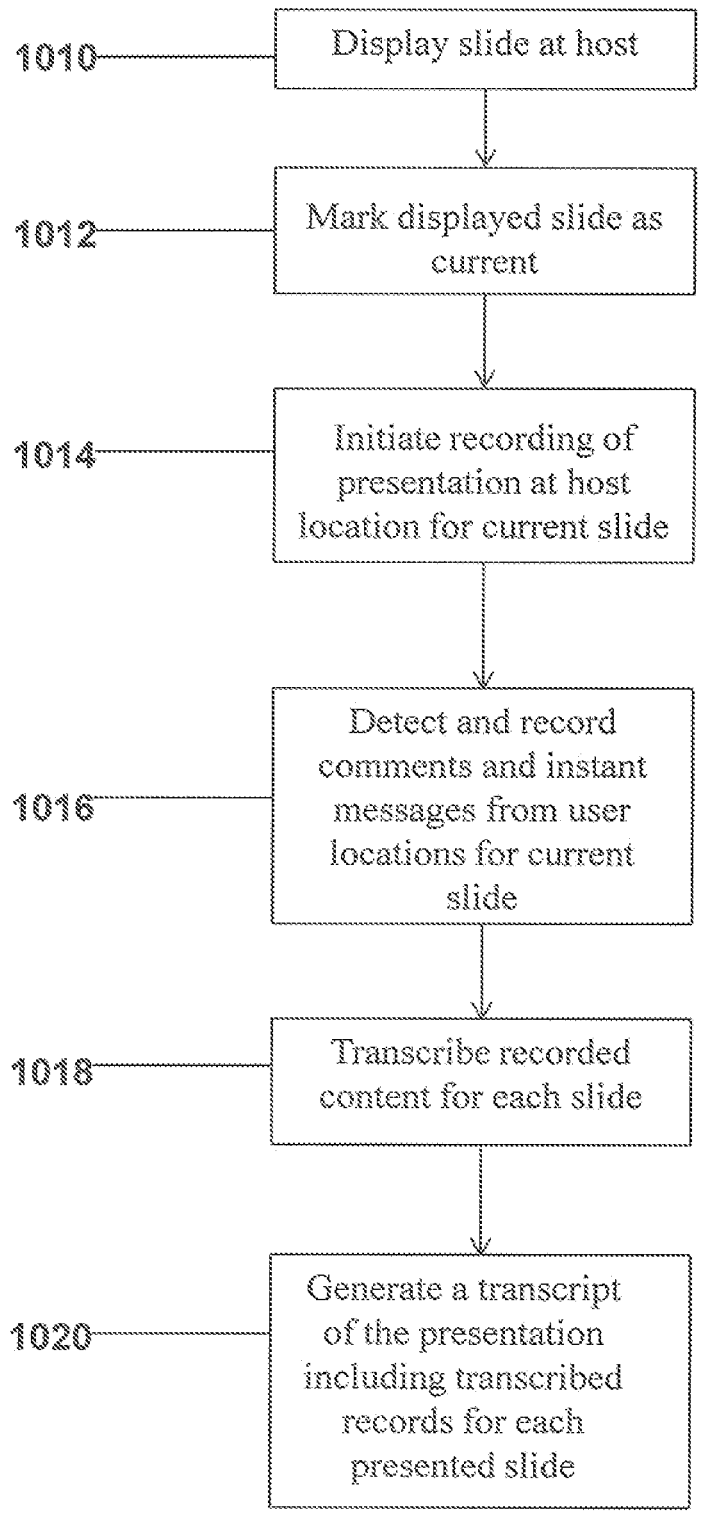
FIG. 10 is a flow diagram of the steps of the method of the present invention for generating a transcript of the host presentation.

FIG. 10 is an embodiment of the present invention for generating a transcript of the host presentation. As the slide presentation proceeds, step 1010 displays a slide at the host location. This displayed side is marked as the current slide of the presentation in step 1012. In step 1014 recording is initiated for the currently marked slide of the presentation. The recording can include the audible descriptions by the host presenter and any notations of any activities of the local user machines. Step 1016 detect and record comments and instant messages from user locations for current slide. Step 1016, continues the detection and recording of comments and instant messages for each slide in the presentation. At the completion of the slide presentation, step 1018 transcribes recorded content for each slide. Step 1020 then generates a transcript of the presentation including transcribed records for each presented slide.

This invention enables an attendee to quickly identify the location of a presentation that is currently in process without the need to spend substantial time and effort trying to identity the current location of the presentation.

If is important to note that while the present invention has been described in the context of a fully functioning data processing system, those skilled in the art will appreciate that the processes of the present invention are capable of being distributed in the form of instructions in a computer readable storage medium and a variety of other forms, regardless of the particular type of medium used to carry out the distribution.

Examples of computer readable storage media include media such as EPROM, ROM, tape, paper, floppy disc, hard disk drive, RAM, and CD-ROMs.

We claim:

1. A method for identifying a current presentation slide being displayed at a local user machine and displaying that identified slide at a system host provider comprising:

uploading a presentation slide file to a system host provider presentation;

marking each slide in the presentation slide file with a unique slide identifier;

downloading the presentation slide file to the local user machine, the presentation slide file is to be accessed and viewed by a user at the local user machine during a presentation at the system host;

sequentially displaying slides of the presentation slide file as presentation at the system host provider and at the local user machine;

monitoring the local user machine;

identifying a slide from the presentation slide file that is currently being displayed at the local user machine; said slide identification compromising;

sending a query to the local user machine to identify current slide being displayed;

receiving a response from the local user containing the slide identifier of the current slide being displayed; and determining at the system host provider the current slide being displayed at the local user machine from slide identifier of the current slide being displayed at the local user machine; and displaying at the system host provider the current slide being displayed at the local user machine.

2. The method as described in claim 1 further comprising before said displaying step, detecting a change in the current slide at the system host provider;

determining after the detected current slide change at the system host provider the current slide at the local user machine and displaying at the system host provider the current slide being displayed at the local user machine after the detected change in the current slide at the system host provider.

3. A method for identifying a current presentation slide being displayed at a local user machine and displaying that identified slide at a system host provider comprising:

uploading a presentation slide file to a system host provider presentation;

marking each slide in the presentation slide file with a unique slide identifier;

downloading the presentation slide file to the local user machine, the presentation slide file is to be accessed and viewed by a user at the local user machine during a presentation at the system host;

sequentially displaying slides of the presentation slide file as presentation at the system host provider and at the local user machine;

monitoring the local user machine and detecting the instant message being submitted to the system host provider and being submitted from a local user machine, by:

detecting an instant message during the slide presentation at the system host provider;

identifying the local user machine sending the identified instant message;

identifying a current presentation slide being shown at the system host provider;

identifying the presentation current slide being displayed at the local user machine submitting the instant message;

identifying a slide from the presentation slide file that is currently being displayed at the local user machine;

marking the current presentation slide being shown at the system host provider when the instant message was detected; and displaying at the system host provider the current slide being displayed at the local user machine.

4. The method as described in claim 3 further comprising:

determining whether the current presentation slide being displayed at the system host provider is the same current presentation slide being displayed at the local user machine; and when the determination is that the current presentation slide being displayed at the local user machine is not the same presentation slide being displayed at the system host provider when the instant message is detected, marking the presentation slide of the local user machine.

5. The method as described in claim 3 further comprising before said displaying step;

detecting a change in the current slide at the system host provider;

determining after the detected current slide change at the system host provider the current slide at the local user machine; and displaying at the system host provider the current slide being displayed at the local user machine after the detected change in the current slide at the system host provider.

* * * * *